United States Patent
Yamaguchi et al.

(10) Patent No.: US 11,634,054 B2
(45) Date of Patent: Apr. 25, 2023

(54) VEHICLE SEAT PAD

(71) Applicant: Archem Inc., Tokyo (JP)

(72) Inventors: Yukiko Yamaguchi, Tokyo (JP); Taisuke Yonezawa, Tokyo (JP); Yoshiyuki Takahashi, Tokyo (JP)

(73) Assignee: Archem Inc., Tokyo (JP)

( * ) Notice: Subject to any disclaimer, the term of this patent is extended or adjusted under 35 U.S.C. 154(b) by 116 days.

(21) Appl. No.: 17/299,306

(22) PCT Filed: Oct. 16, 2019

(86) PCT No.: PCT/JP2019/040774
§ 371 (c)(1),
(2) Date: Jun. 3, 2021

(87) PCT Pub. No.: WO2020/121643
PCT Pub. Date: Jun. 18, 2020

(65) Prior Publication Data
US 2022/0048421 A1     Feb. 17, 2022

(30) Foreign Application Priority Data
Dec. 14, 2018 (JP) .............................. JP2018-234149

(51) Int. Cl.
*B60N 2/90* (2018.01)

(52) U.S. Cl.
CPC ...................................... *B60N 2/90* (2018.02)

(58) Field of Classification Search
CPC ....................................................... B60N 2/90
USPC .................................................. 297/452.48
See application file for complete search history.

(56) References Cited

U.S. PATENT DOCUMENTS

| 9,738,192 B2 | 8/2017 | Hirata et al. |
| 2008/0073966 A1 | 3/2008 | Ali et al. |
| 2008/0290716 A1* | 11/2008 | Ekornes ............... A47C 27/148 |
| | | 297/452.48 X |

(Continued)

FOREIGN PATENT DOCUMENTS

| CN | 101854836 A | 10/2010 |
| JP | 2004016312 A | 1/2004 |
| JP | 2009023596 A | 2/2009 |

(Continued)

OTHER PUBLICATIONS

Jun. 8, 2021, International Preliminary Report on Patentability issued in the International Patent Application No. PCT/JP2019/040774.

(Continued)

*Primary Examiner* — Anthony D Barfield
(74) *Attorney, Agent, or Firm* — Kenja IP Law PC

(57) ABSTRACT

In a vehicle seat pad 1, a seating portion has a plurality of bottomless or bottomed holes 10*h*, and in a horizontal projection plane, a ratio R11U of a total area of under-femoral-region holes in an upper surface of a femoral region-placed portion with respect to an entire area of the femoral region-placed portion, a ratio R12CU of a total area of under-hip holes in an upper surface of an under-hip center portion with respect to an entire area of the under-hip center portion, and a ratio R12SU of a total area of under-hip holes in upper surfaces of a pair of under-hip side portions with respect to entire areas of the pair of under-hip side portions satisfy R11U>R12 CU>R12SU.

2 Claims, 2 Drawing Sheets

(56) References Cited

U.S. PATENT DOCUMENTS

2010/0194171 A1    8/2010  Hirata et al.
2015/0232007 A1*  8/2015  Ali ........................... B60N 2/58
    297/452.48 X

FOREIGN PATENT DOCUMENTS

| JP | 2009160371 A | 7/2009 |
| --- | --- | --- |
| JP | 2010184085 A | 8/2010 |
| JP | 2011110366 A | 6/2011 |
| JP | 2013142210 A | 7/2013 |
| JP | 2014061769 A | 4/2014 |
| JP | 2014128359 A | 7/2014 |
| JP | 2015223849 A | 12/2015 |
| JP | 2017056078 A | 3/2017 |
| JP | 2017056879 A | 3/2017 |

OTHER PUBLICATIONS

Nov. 26, 2019, International Search Report issued in the International Patent Application No. PCT/JP2019/040774.

* cited by examiner

VEHICLE SEAT PAD

TECHNICAL FIELD

The present disclosure relates to a vehicle seat pad.

The present application claims priority based on JP 2018-234149 filed in Japan on Dec. 14, 2018, the entire contents of which are incorporated herein.

BACKGROUND

As a vehicle seat pad, there is a seat pad with a plurality of holes provided in a seating portion for supporting a seated person (PTL 1, for example).

CITATION LIST

Patent Literature

PTL 1: Japanese Patent Laid-Open No. 2017-56078

SUMMARY

Technical Problem

However, there is room for further improvement in easiness of a driving operation with legs of a driver (hereinafter, referred to as "operability") in the vehicle seat pad in PTL 1.

An object of the disclosure is to provide a vehicle seat pad capable of improving operability.

Solution to Problem

There is provided a vehicle seat pad according to the disclosure including: a seating portion that is formed of a resin foam for supporting a seated person, in which when a portion of the seating portion on a front side beyond a first boundary position that is separated from a frontmost end position of the seating portion by a length of 45% of an entire length of the seating portion in a front-back direction is defined as a femoral region-placed portion while a portion on a back side beyond the first boundary position is defined as an under-hip portion, and a portion of the under-hip portion on an inner side in a left-right direction beyond a pair of second boundary positions that are separated on outer sides in the left-right direction from a left-right direction center line of the seating portion by a length of 25% of an entire length of the under-hip portion in the left-right direction is defined as an under-hip center portion while portions on both the outer sides in the left-right direction beyond the pair of second boundary positions are defined as a pair of under-hip side portions, the seating portion has a plurality of bottomless or bottomed holes, the plurality of holes include one or a plurality of under-femoral-region holes provided in the femoral region-placed portion and one or a plurality of under-hip holes provided in the under-hip portion, and in a horizontal projection plane, a ratio R11U of a total area of the under-femoral-region holes in an upper surface of the femoral region-placed portion with respect to an entire area of the femoral region-placed portion, a ratio R12CU of a total area of the under-hip holes in an upper surface of the under-hip center portion with respect to an entire area of the under-hip center portion, and a ratio R12SU of a total area of the under-hip holes in upper surfaces of the pair of under-hip side portions with respect to an entire area of the pair of under-hip side portions satisfy R11U>R12CU>R12SU.

Advantageous Effect

According to the disclosure, it is possible to provide a vehicle seat pad capable of improving operability.

DETAILED DESCRIPTION

A vehicle seat pad according to the disclosure can be used for any type of vehicle. Also, the vehicle seat pad according to the disclosure is preferably used for a driver's seat, in particular.

Hereinafter, an embodiment of the vehicle seat pad according to the disclosure will be described as an example with reference to the drawings. The same reference signs are applied to components that are common in each of the drawings. Hereinafter, the vehicle seat pad will also simply be referred to as a "seat pad".

Figure 1:
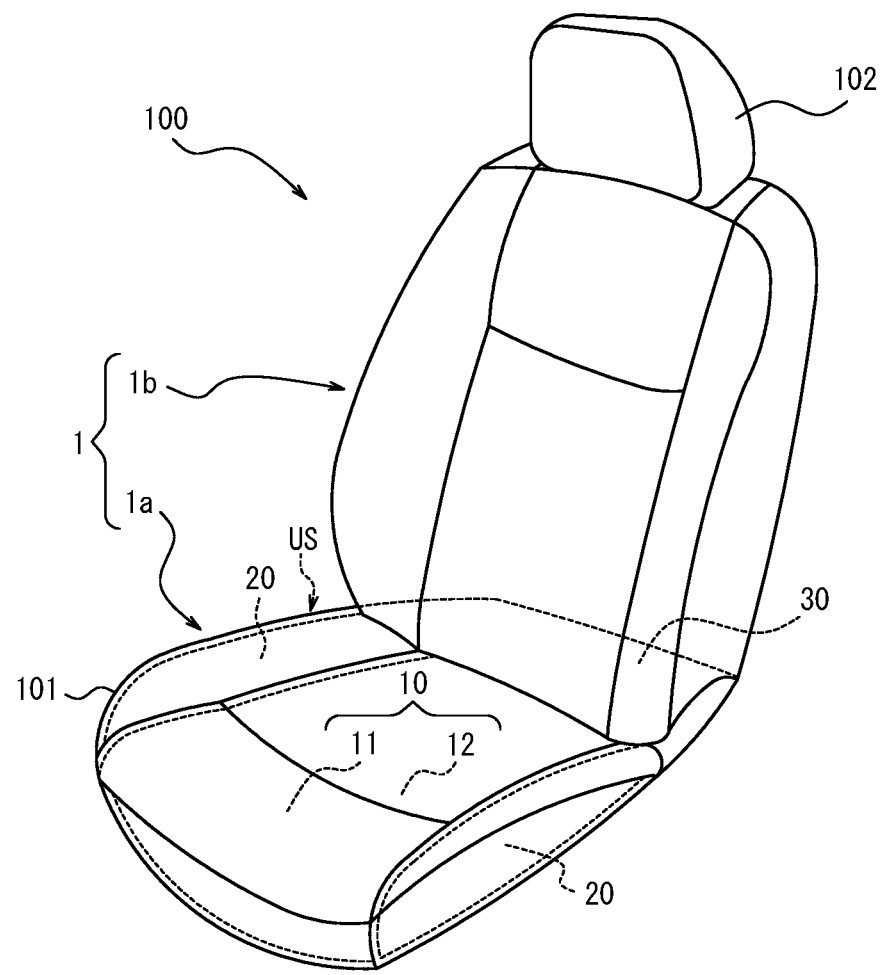
FIG. 1 is a perspective view illustrating a vehicle seat including a vehicle seat pad according to an embodiment of the disclosure.
Figure 1:
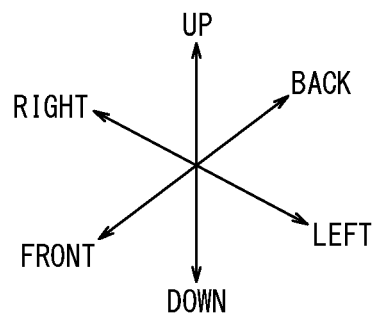

FIG. 1 illustrates a vehicle seat 100 including a vehicle seat pad 1 according to an embodiment of the disclosure. As illustrated by a dashed line in FIG. 1, the seat pad 1 according to the present embodiment includes a cushion pad 1a for seating a seated person and a back pad 1b for supporting the back of the seated person. The vehicle seat 100 includes, for example, a cover 101 that covers a front side (the side of the seated person) of the seat pad 1, a frame (not illustrated) that supports the cushion pad 1a from the lower side, a frame (not illustrated) that is mounted on the back side of the back pad 1b, and a headrest 102 that is mounted above the back pad 1b to support the head of seated person, in addition to the seat pad 1. The cover 101 is made of, for example, a breathable material (a cloth or the like). Each of the cushion pad 1a and the back pad 1b is formed of a resin foam. The resin foam configuring the cushion pad 1a and the back pad 1b is preferably a soft resin foam and is more preferably a soft polyurethane foam. The cushion pad 1a and the back pad 1b can be configured as mutually separate elements.

In the present specification, each of the directions "up", "down", "left", "right", "front", and "back" when seen from the seated person who is seated in the seat pad 1 will be simply referred to as "up", "down", "left", "right", "front", and "back" as illustrated in each drawing.

Hereinafter, the cushion pad 1a rather than the back pad 1b in the seat pad 1 will be described. Therefore, the cushion pad 1a may simply be referred to as a "seat pad 1".

Figure 2:
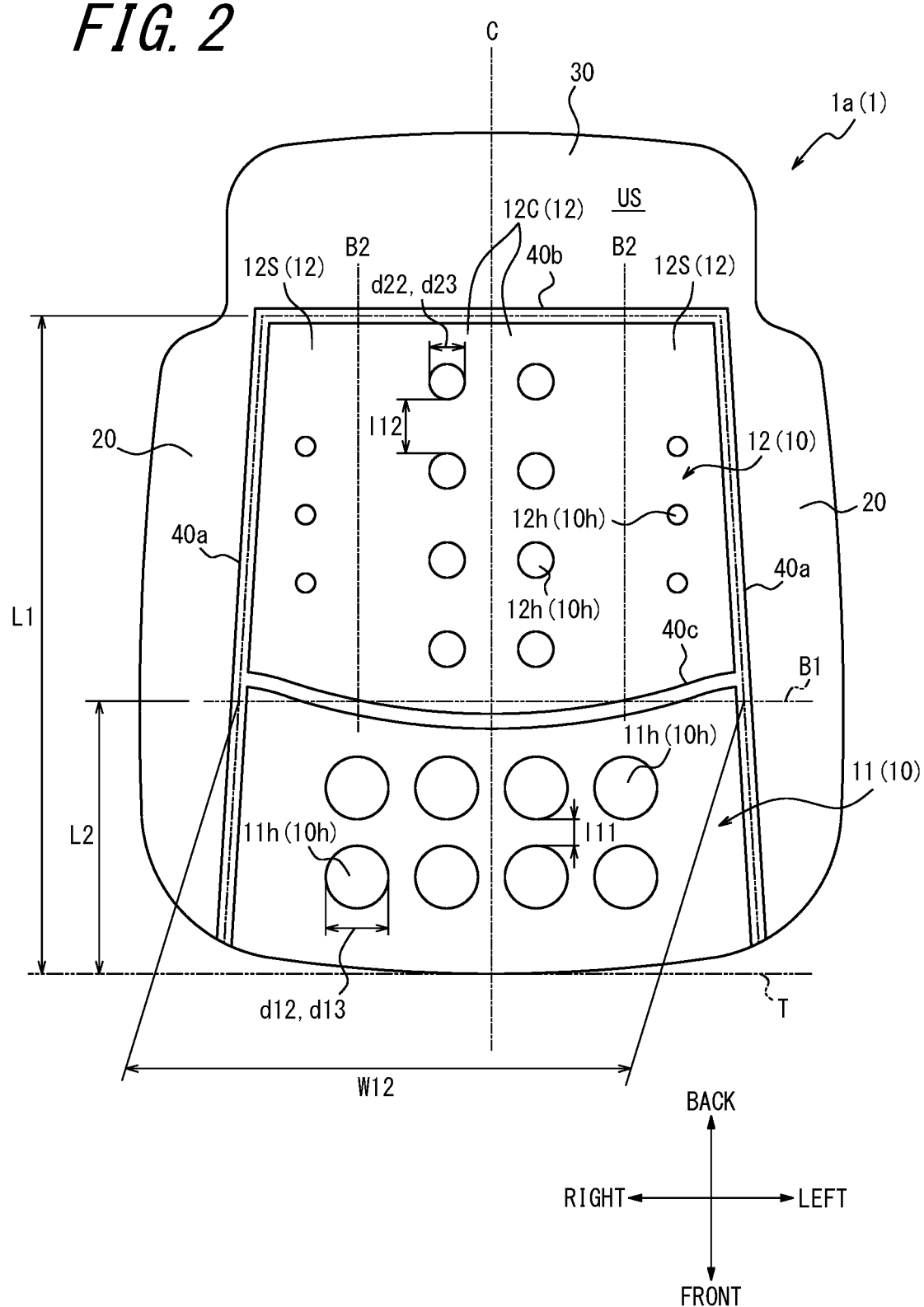
FIG. 2 is a plan view illustrating a state of a cushion pad in FIG. 1 when seen from the upper side.

FIG. 2 is a plan view illustrating a state of the cushion pad 1a in the seat pad 1 in FIG. 1 when seen from the upper side, and in other words, FIG. 2 is a horizontal projection view illustrating a state in which the seat pad 1 (cushion pad 1a) is projected to a horizontal projection plane. As illustrated in FIGS. 1 and 2, the cushion pad 1a has a seating portion (also referred to as a "main pad portion") 10 configured to support the seated person from the lower side, a pair of side pad portions 20 that are positioned on both left and right sides of the seating portion 10, project upward as compared with the seating portion 10, and are configured to support the seated person from both left and right sides, and a back pad facing portion 30 that is positioned backward as compared with the seating portion 10 and is configured to be disposed to face the back pad 1b in the up-down direction.

In the example in FIG. 2, each of grooves 40a that extend substantially in the front-back direction between the seating portion 10 and the side pad portions 20, a groove 40b that extends substantially in the left-right direction between the seating portion 10 and the back pad facing portion 30, and a groove 40c that extends substantially in the left-right direction inside the seating portion 10 is provided in an upper surface (front surface) US of the cushion pad 1a. An attachment tool (not illustrated) for attaching the cover 101 (FIG. 1) to the cushion pad 1a is disposed inside the grooves 40a, 40b, and 40c. In the example in FIG. 2, boundary lines between the seating portion 10 and the side pad portions 20 are groove width center lines of the grooves 40a therebetween, and a boundary line between the seating portion 10 and the back pad facing portion 30 is a groove width center line of the groove 40b therebetween, in the horizontal projection plane.

However, the grooves 40a and 40b may be located at positions that are different from those of the boundary lines between the seating portion 10 and the side pad portions 20 and the boundary line between the seating portion 10 and the back pad facing portion 30. Also, the grooves 40a to 40c may not be provided in the upper surface US of the cushion pad 1a.

The seating portion 10 includes a femoral region-placed portion 11 that is configured to support the femoral region of the seated person from the lower side and an under-hip portion 12 that is positioned behind the femoral region-placed portion 11 and is configured to support the hip of the seated person form the lower side. In the present specification, a portion of the seating portion 10 on the front side beyond a front-back direction position (hereinafter, referred to as a "first boundary position") B1 that is separated from a frontmost end position T of the seating portion 10 by a length L2 of 45% of an entire length L1 of the seating portion 10 in the front-back direction in the horizontal projection plane will be defined as a femoral region-placed portion 11, and a portion on the back side beyond the first boundary position B1 will be defined as an under-hip portion 12, as illustrated in FIG. 2. In other words, the first boundary position B1 between the femoral region-placed portion 11 and the under-hip portion 12 is defined regardless of the position of the groove 40c even in a case in which the groove 40c is disposed inside the seating portion 10 as in the example in FIG. 2.

The under-hip portion 12 includes an under-hip center portion 12C located on a virtual line (hereinafter, referred to as a "left-right direction center line") C passing through the center of the seating portion 10 in the left-right direction and a pair of under-hip side portions 12S located on both sides of the under-hip center portion 12C in the left-right direction. Specifically, a portion of the under-hip portion 12 on the inner side in the left-right direction beyond a pair of left-right direction positions (hereinafter, referred to as "second boundary positions") B2 that are separated from the left-right direction center line C of the seating portion 10 by a length of 25% of an entire length W12 of the under-hip portion 12 in the left-right direction will be defined as an under-hip center portion 12C, and a portion on both outer sides of the pair of second boundary positions B2 in the left-right direction will be defined as a pair of under-hip side portions 12S.

Here, the "entire length W12 of the under-hip portion 12 in the left-right direction" indicates a maximum value of the length of the under-hip portion 12 in the left-right direction (in other words, the length of the under-hip portion in the left-right direction at a front-back direction position at which the length of the under-hip portion 12 in the left-right direction is maximum) in a case in which the length of the under-hip portion 12 in the left-right direction (the distance between the groove width center lines of the pair of grooves 40a) is not uniform in the front-back direction as in the example in FIG. 2. In the example in FIG. 2, the length of the under-hip portion 12 in the left-right direction gradually increases toward the front side, and the entire length W12 of the under-hip portion 12 in the left-right direction corresponds to the length of the under-hip portion 12 in the left-right direction at a front end (that is, the first boundary position B1) of the under-hip portion 12.

As illustrated in FIG. 2, the seating portion 10 has a plurality of bottomless or bottomed (bottomless in the example of the drawing) holes 10h that extend in the up-down direction inside the seating portion 10.

In regard to the holes 10h, "bottomless" indicates that the holes 10h are through-holes, that is, "bottomless" indicates that the holes 10h penetrate through the seating portion 10. Also, in regard to the holes 10h, "bottomed" indicates that the holes 10h are depressions, that is, "bottomed" indicates that one end of each hole 10h is opened in any surface of the seating portion 10 while the other end (bottom portion) of the hole 10h is not opened in any surface of the seating portion 10 and is terminated inside the seating portion 10.

The seating portion 10 has the plurality of holes 10h and can thus reduce the weight of the seat pad 1 (cushion pad 1a), improve breathability, and reduce heat storage as compared with a case in which no holes 10h are included. The weight reduction of the seat pad 1 (cushion pad 1a) leads to an improvement in fuel efficiency of the vehicle and thus energy saving. The improvement in breathability and the reduction of heat storage of the seat pad 1 (cushion pad 1a) lead to an improvement in how an AC in the vehicle works and thus energy saving.

In a case in which the holes 10h are bottomless, the holes 10h are preferably opened in the upper surface US and a back surface (lower surface; not illustrated) BS of the seating portion 10 as in the example in FIG. 2. In a case in which the holes 10h are bottomed holes, the holes 10h are preferably opened in the upper surface US or the back surface BS of the seating portion 10. Note that all the plurality of holes 10h provided in the seating portion 10 may be bottomless as in FIG. 2, the plurality of holes 10h may include one or a plurality of bottomless holes 10h and one or a plurality of bottomed holes 10h, or all the plurality of holes 10h may be bottomed.

The plurality of holes 10h in the seating portion 10 include one or a plurality of (in the example of FIG. 2, a plurality of) bottomless or bottomed (bottomless in the example of the drawing) under-femoral-region holes 11h provided in the femoral region-placed portion 11 and one or a plurality of (in the example of FIG. 2, a plurality of) bottomless or bottomed (bottomless in the example of the drawing) under-hip holes 12h provided in the under-hip portion 12.

According to the present embodiment, in the horizontal projection plane, a ratio R11U (R11U=A11hU×100/A11 [%]) of a total area A11hU of the under-femoral-region holes 11$h$ in the upper surface US of the femoral region-placed portion 11 with respect to an entire area A11 of the femoral region-placed portion 11, a ratio R12CU (R12CU=A12$h$CU×100/A12C [%]) of a total area A12$h$CU of the under-hip holes 12$h$ in the upper surface US of the under-hip center portion 12C with respect to an entire area A12C of the under-hip center portion 12C, and a ratio R12SU (R12SU=A12$h$SU×100/A12S [%]) of a total area A12$h$SU of the under-hip holes 12$h$ in the upper surfaces US of the pair of under-hip side portions 12S with respect to an entire area A12S of the pair of under-hip side portions 12S satisfy R11U>R12CU>R12SU.

Here, the "entire area A11 of the femoral region-placed portion 11" in the horizontal projection plane indicates an area of the entire region sectioned by the outer edge of the femoral region-placed portion 11 in the horizontal projection plane and also includes an area occupied by the under-femoral-region holes 11$h$. Similarly, the "entire area A12C of the under-hip center portion 12C" in the horizontal projection plane indicates an area of the entire region sectioned by the outer edge of the under-hip center portion 12C in the horizontal projection plane and also includes an area occupied by the under-hip holes 12$h$ located inside the under-hip center portion 12C. The "entire area A12S of the pair of under-hip side portions 12S" in the horizontal projection plane indicates an area of the entire regions sectioned by the outer edges of the pair of under-hip side portions 12S in the horizontal projection plane and also includes an area occupied by the under-hip holes 12$h$ located inside the pair of under-hip side portions 12S.

The "total area A11$h$U of the under-femoral-region holes 11$h$ in the upper surface US of the femoral region-placed portion 11" in the horizontal projection plane is a sum of areas of the openings of the under-femoral-region holes 11$h$ in the upper surface US of the femoral region-placed portion 11 in the horizontal projection plane. Similarly, the "total area A12$h$CU of the under-hip holes 12$h$ in the upper surface US of the under-hip center portion 12C" in the horizontal projection plane is a sum of the areas of the openings of the under-hip holes 12$h$, which are located inside the under-hip center portion 12C, in the upper surface US of the under-hip center portion 12C in the horizontal projection plane. The "total area A12$h$SU of the under-hip holes 12$h$ in the upper surfaces US of the pair of under-hip side portions 12S" in the horizontal projection plane is a sum of areas of the openings of the under-hip holes 12$h$, which are located inside the pair of under-hip side portions 12S, in the upper surfaces US of the pair of under-hip side portions 12S in the horizontal projection plane.

Note that although the holes 10$h$ are not present on the first boundary position B1 between the femoral region-placed portion 11 and the under-hip portion 12 in the horizontal projection plane in the example of FIG. 2, the holes 10$h$ may be present on the first boundary position B1. In that case, portions of the holes 10$h$ located inside the femoral region-placed portion 11 from among the holes 10$h$ located on the first boundary position B1 in the horizontal projection plane are counted as the under-femoral-region holes 11$h$, and portions of the holes 10$h$ located inside the under-hip portion 12 from among the holes 10$h$ located on the first boundary position B1 are counted as the under-hip hole 12$h$.

Also, although the under-hip holes 12$h$ are not present on the second boundary positions B2 between the under-hip center portion 12C and the under-hip side portions 12S in the horizontal projection plane in the example of FIG. 2, the under-hip holes 12$h$ may be present on the second boundary positions B2. In that case, portions of the under-hip holes 12$h$ located inside the under-hip center portion 12C from among the under-hip holes 12$h$ located on the second boundary position B2 are counted as the under-hip holes 12$h$ located in the under-hip center portion 12C, and portions of the under-hip holes 12$h$ located inside the under-hip side portions 12$s$ from among the under-hip holes 12$h$ located on the second boundary position B2 are counted as the under-hip holes 12$h$ located inside the under-hip side portions 12S.

In the present embodiment, R11U>R12CU and R11U>R12SU are satisfied in order to satisfy R11U>R12CU>R12SU as described above.

Therefore, the ratio R11U of the total area A11$h$U of the under-femoral-region holes 11$h$ in the upper surface US of the femoral region-placed portion 11 with respect to the entire area A11 of the femoral region-placed portion 11 in the horizontal projection plane is higher than the ratio R12U (R12U=A12$h$U×100/A12 [%]) of the total area A12$h$U of the under-hip holes 12$h$ in the upper surface US of the under-hip portion 12 with respect to the entire area A12 of the under-hip portion 12 (R11U>R12U) in the present embodiment.

Here, the "entire area A12 of the under-hip portion 12" in the horizontal projection plane indicates an area of the entire region sectioned by the outer edge of the under-hip portion 12 in the horizontal projection plane and also includes the area occupied by the under-hip holes 12$h$. The "total area A12$h$U of the under-hip holes 12$h$ in the upper surface US of the under-hip portion 12" in the horizontal projection plane is a sum of areas of the openings of the under-hip holes 12$h$ in the upper surface US of the under-hip portion 12 in the horizontal projection plane.

According to the present embodiment, since R11U>R12U, it is possible to set porosity of the femoral region-placed portion 11 to be higher than porosity of the under-hip portion 12 and thus to make the femoral region-placed portion 11 softer than the under-hip portion 12. In this manner, the seated person (driver) seated in the seating portion 10 can easily move the femoral region of the person himself/herself and can easily perform driving operations in a case in which the seat pad 1 (cushion pad 1$a$) is placed in the driver's seat. It is thus possible to improve operability of the seat pad 1. Also, since it is possible to make the under-hip portion 12 harder than the femoral region-placed portion 11 by setting R11U>R12U, it is possible to securely support the hip of the seated person seated in the seating portion 10. In this manner, the seated person can stably perform driving operations. Also, it is possible to improve seating comfort.

According to the present embodiment, given the ratio R11U that is considered to be constant, it is possible to set the ratio R11U in the upper surface US of the femoral region-placed portion 11 to be higher than that in a case in which R11U=R12U, thus to set porosity of the femoral region-placed portion 11 to be high, and thereby to achieve weight reduction, an improvement in breathability, reduction of heat storage, and the like of the seat pad 1 (cushion pad 1$a$) in addition to the improvement in operability.

Also, according to the present embodiment, the seated person can easily move the femoral region of the person himself/herself and the hip of the person himself/herself can be securely supported even in a case in which the seat pad 1 is placed at a seat other than the driver's seat, and it is thus possible to improve seating comfort.

In the present embodiment, since R11U>R12CU>R12SU is satisfied as described above, the ratio R12CU of the total area A12$h$CU of the under-hip holes 12$h$ in the upper surface US of the under-hip center portion 12C with respect to the entire area A12C of the under-hip center portion 12C is higher than the ratio R12SU of the total area A12hSU of the under-hip holes 12h in the upper surfaces US of the pair of under-hip side portions 12S with respect to the entire area A12S of the pair of under-hip side portions 12S (R12CU>R12SU).

It is possible to set the porosity of the pair of under-hip side portions 12S to be lower than the porosity of the under-hip center portion 12C and thus to make the pair of under-hip side portions 12S harder than the under-hip center portion 12C by setting R12CU>R12SU. In this manner, since the hip of the seated person is satisfactorily held by the pair of under-hip side portions 12S from both sides in the left-right direction, it is possible to curb wobbling of the seated person when shaking in the left-right direction occurs at the time of a change in direction of the vehicle or the like.

Note that in a case in which the under-hip holes 12h are uniformly provided in the entire under-hip portion 12 thereby to achieve R12CU=R12SU, the under-hip portion 12 becomes soft and is more likely to warp, and wobbling is more likely to occur as compared with a case in which there are no under-hip holes 12h at all in the under-hip portion 12.

According to the seat pad 1 of the present embodiment, it is possible to obtain excellent effects such as an improvement in operability and seating comfort and reduction of wobbling merely by adjusting the disposition of the holes 10h as described above without changing the composition and the cell structure of the resin foam for each part.

The disposition pattern, the number, the diameter in the horizontal projection plane, the area, the shape, and the like of the holes 10h (the under-femoral-region holes 11h and the under-hip holes 12h) may be arbitrarily determined. In terms of an improvement in operability and seating comfort, reduction of wobbling, and the like, the disposition pattern of the holes 10h is preferably symmetric with respect to the left-right direction center line C of the seating portion 10.

Although the shape of the holes 10h (the under-femoral-region holes 11h and the under-hip holes 12h) in the horizontal projection plane is a circular shape (perfect circle) in the illustrated example, other shapes, for example, polygonal shapes such as an oval, a triangular shape, a square shape, a rhomboidal shape, a trapezoidal shape, or the like are also preferably employed.

As a method of forming the holes 10h in the seating portion 10, a method of providing projections in a molding surface of at least any one of an upper mold piece for molding the back surface BS of the seat pad 1 and a lower mold piece for molding the upper surface US of the seat pad 1 of a mold for foam-molding the seat pad 1 (cushion pad 1a) and molding the holes 10h with circumferential surfaces of the projections in a state in which the upper mold piece and the lower mold piece are fitted to each other, for example, is preferably employed.

However, the holes 10h may be formed by a method that is different from the method.

In the example of FIG. 2, the plurality of holes 10h provided in the seating portion 10 have constant diameter, area, and shape from the upper surface US to the back surface (lower surface) BS of the seating portion 10. Although not illustrated in the drawing, wall surfaces of the holes 10h linearly extend in the section in the vertical direction (up-down direction) and are parallel to the vertical direction (up-down direction).

Also, in the example of FIG. 2, a ratio R11B (R11B=A11hB×100/A11 [%]) of a total area A11hB of the under-femoral-region holes 11h in the back surface BS of the femoral region-placed portion 11 with respect to the entire area A11 of the femoral region-placed portion 11 in the horizontal projection plane is the same as the ratio R11U of the total area A11hU of the under-femoral-region holes 11h in the upper surface US of the femoral region-placed portion 11 with respect to the entire area A11 of the femoral region-placed portion 11 (R11B=R11U). A ratio R12B (R12B=A12hB×100/A12 [%]) of a total area A12hB of the under-hip holes 12h in the back surface BS of the under-hip portion 12 with respect to the entire area A12 of the under-hip portion 12 in the horizontal projection plane is the same as the ratio R12U of the total area A12hU of the under-hip holes 12h in the upper surface US of the under-hip portion 12 with respect to the entire are A12 of the under-hip portion 12 (R12B=R12U). A ratio R12CB (R12CB=A12hCB×100/A12C [%]) of a total area A12hCB of the under-hip holes 12h in the back surface BS of the under-hip center portion 12C with respect to the entire area A12C of the under-hip center portion 12C in the horizontal projection plane is the same as the ratio R12CU of the total area A12hCU of the under-hip holes 12h in the upper surface US of the under-hip center portion 12C with respect to the entire area A12C of the under-hip center portion 12C (R12CB=R12CU). Also, a ratio R12SB (R12SB=A12hSB×100/A12S [%]) of a total area A12hSB of the under-hip holes 12h in the back surfaces BS of the pair of under-hip side portions 12S with respect to the entire area A12S of the pair of under-hip side portions 12S in the horizontal projection plane is the same as the ratio R12SU of the total area A12hSU of the under-hip holes 12h in the upper surfaces US of the pair of under-hip side portions 12S with respect to the entire area A12S of the pair of under-hip side portions 12S (R12SB=R12SU).

Here, the "total area A11hB of the under-femoral-region holes 11h in the back surface BS of the femoral region-placed portion 11" in the horizontal projection plane is a sum of areas of the openings of the under-femoral-region holes 11h in the back surface BS of the femoral region-placed portion 11 in the horizontal projection plane. Similarly, the "total area A12hB of the under-hip holes 12h in the back surface BS of the under-hip portion 12" in the horizontal projection plane is a sum of areas of the openings of the under-hip holes 12h in the back surface BS of the under-hip portion 12 in the horizontal projection plane. The "total area A12hCB of the under-hip holes 12h in the back surface BS of the under-hip center portion 12C" in the horizontal projection plane is a sum of areas of the openings of the under-hip holes 12h, which are located inside the under-hip center portion 12C, in the back surface BS of the under-hip center portion 12C in the horizontal projection plane. The "total area A12hSB of the under-hip holes 12h in the back surfaces BS of the pair of under-hip side portions 12S" in the horizontal projection plane is a sum of areas of the openings of the under-hip holes 12h, which are located inside the pair of under-hip side portions 12S, in the back surfaces BS of the pair of under-hip side portions 12S in the horizontal projection plane.

In this case, since the shape of the projections for molding the holes 10h in the mold for foam-molding the cushion pad 1a becomes simple, the mold can easily be manufactured. Also, it is possible to easily pull the projections of the mold out from the holes 10h when the cushion pad 1a is released from the mold at the time of manufacturing the seat pad 1 (cushion pad 1a). Therefore, the holes 10h are easily formed.

Note that the diameter, the area, and the shape of the holes 10h may be constant from the upper surface US to the back surface BS of the seating portion 10 with the wall surfaces of the holes 10h inclined with respect to the vertical direction.

Although not illustrated, some or all of the plurality of holes 10h in the seating portion 10 may have a diameter and an area gradually decreasing from the upper surface US toward the back surface BS of the seating portion 10. In this case, the wall surfaces of the holes 10h may linearly extend in the section in the vertical direction (up-down direction) and may be inclined at an acute angle with respect to the vertical direction (up-down direction) or may extend in a curved shape in the section in the vertical direction.

In this case, the ratio R11B of the total area A11hB of the under-femoral-region holes 11h in the back surface BS of the femoral region-placed portion 11 with respect to the entire area A11 of the femoral region-placed portion 11 in the horizontal projection plane may be smaller than the ratio R11U of the total area A11hU of the under-femoral-region holes 11h in the upper surface US of the femoral region-placed portion 11 with respect to the entire area A11 of the femoral region-placed portion 11 (R11B<R11U). Additionally/alternatively, the ratio R12B of the total area A12hB of the under-hip holes 12h in the back surface BS of the under-hip portion 12 with respect to the entire area A12 of the under-hip portion 12 may be smaller than the ratio R12U of the total area A12hU of the under-hip holes 12h in the upper surface US of the under-hip portion 12 with respect to the entire area A12 of the under-hip portion 12 (R12B<R12U). Additionally/alternatively, the ratio R12CB of the total area A12h CB of the under-hip holes 12h in the back surface BS of the under-hip center portion 12C with respect to the entire area A12C of the under-hip center portion 12C in the horizontal projection plane may be smaller than the ratio R12CU of the total area A12hCU of the under-hip holes 12h in the upper surface US of the under-hip center portion 12C with respect to the entire area A12C of the under-hip center portion 12C (R12CB<R12CU). Additionally/alternatively, the ratio R12SB of the total area A12hSB of the under-hip holes 12h in the back surfaces BS of the pair of under-hip side portions 12S with respect to the entire area A12S of the pair of under-hip side portions 12S in the horizontal projection plane may be smaller than the ratio R12SU of the total area A12hSU of the under-hip holes 12h in the upper surfaces US of the pair of under-hip side portions 12S with respect to the entire area A12S of the pair of under-hip side portions 12S (R12SB<R12SU).

In this case, it is possible to gradually make the seat pad 1 (cushion pad 1a) harder from the upper side toward the lower side than a case in which R11B=R11U, R12B=R12U, R12CB=R12CU, and R12SB=R12SU as in the example of FIG. 2. In this manner, the seated person obtains a feeling (sense of seating) that the seated person feels soft first and feels hard later when seated in the seating portion 10. It is thus possible to improve seating comfort. Also, in this case, providing the projections for molding the holes 10h only in the lower mold piece for molding the upper surface US of the seat pad 1 in the mold for foam-molding the seat pad 1 (cushion pad 1a) facilitates the releasing, and the holes 10h are easily formed.

In this case, the ratio R11B of the total area A11hB of the under-femoral-region holes 11h in the back surface BS of the femoral region-placed portion 11 with respect to the entire area A11 of the femoral region-placed portion 11, the ratio R12CB of the total area A12hCB of the under-hip holes 12h in the back surface BS of the under-hip center portion 12C, and the ratio R12SB of the total area A12hSB of the under-hip holes 12h in the back surfaces BS of the pair of under-hip side portions 12S in the horizontal plane preferably satisfy R11B≥R12CB≥R12SB and more preferably satisfy R11B>R12CB>R12SB, in terms of an improvement in operability and seating comfort and reduction of wobbling.

Note that in a case in which the ratios R11U, R12U, R12CU, and R12SU in the upper surface US of the seat pad 1 are considered to be constant, the porosity on the side of the back surface BS of the seat pad 1 is higher in the example illustrated in FIG. 2 than in the case in which the diameter and the area of some or all of the plurality of holes 10h in the seating portion 10 are gradually reduced from the upper surface US toward the back surface BS of the seating portion 10 as described above, and it is thus possible to achieve weight reduction, an improvement in breathability, reduction of heat storage, and the like.

In each of the aforementioned examples, the ratio R11U of the total area A11hU of the under-femoral-region holes 11h in the upper surface US of the femoral region-placed portion 11 with respect to the entire area A11 of the femoral region-placed portion 11 in the horizontal projection plane is preferably 5 to 25% and is more preferably 7 to 23%.

Also, the ratio R12U of the total area A12hU of the under-hip holes 12h in the upper surface US of the under-hip portion 12 with respect to the entire area A12 of the under-hip portion 12 in the horizontal projection plane is preferably 1 to 20% and is more preferably 3 to 18%.

In this manner, it is possible to improve operability and to improve seating comfort.

In terms of similar points, the ratio R11U of the total area A11hU of the under-femoral-region holes 11h in the upper surface US of the femoral region-placed portion 11 with respect to the entire area A11 of the femoral region-placed portion 11 in the horizontal projection plane is preferably 1.1 to 3.0 times and is more preferably 1.5 to 2.5 times the ratio R12U of the total area A12hU of the under-hip holes 12h in the upper surface US of the under-hip portion 12 with respect to the entire area A12 of the under-hip portion 12.

In each of the aforementioned examples, the ratio R11B of the total area A11hB of the under-femoral-region holes 11h in the back surface BS of the femoral region-placed portion 11 with respect to the entire area A11 of the femoral region-placed portion 11 in the horizontal projection plane is preferably 3 to 25% and is more preferably 5 to 23%.

Also, the ratio R12B of the total area A12hB of the under-hip holes 12h in the back surface BS of the under-hip portion 12 with respect to the entire area A12 of the under-hip portion 12 in the horizontal projection plane is preferably 0.5 to 20% and is more preferably 1 to 18%.

In this manner, it is possible to improve operability and to improve seating comfort.

In terms of similar points, the ratio R11B of the total area A11hB of the under-femoral-region holes 11h in the back surface BS of the femoral region-placed portion 11 with respect to the entire area A11 of the femoral region-placed portion 11 in the horizontal projection plane is preferably 1.1 to 3.0 times and is more preferably 1.5 to 2.5 times the ratio R12B of the total area A12hB of the under-hip holes 12h in the back surface BS of the under-hip portion 12 with respect to the entire area A12 of the under-hip portion 12.

In each of the aforementioned examples, the ratio R12CU of the total area A12hCU of the under-hip holes 12h in the upper surface US of the under-hip center portion 12C with respect to the entire area A12C of the under-hip center portion 12C in the horizontal projection plane is preferably 2 to 23% and is more preferably 4 to 21%.

Also, the ratio R12SU of the total area A12*h* SU of the under-hip holes 12*h* in the upper surfaces US of the pair of under-hip side portions 12S with respect to the entire area A12S of the pair of under-hip side portions 12S in the horizontal projection plane is preferably 1 to 15% and is more preferably 3 to 13%.

In this manner, it is possible to effectively reduce wobbling.

In terms of similar points, the ratio R12CU of the total area A12*h*CU of the under-hip holes 12*h* in the upper surface US of the under-hip center portion 12C with respect to the entire area A12C of the under-hip center portion 12C in the horizontal projection plane is preferably 1.1 to 3.0 times and is more preferably 1.5 to 2.5 times the ratio R12SU of the total area A12*h*SU of the under-hip holes 12*h* in the upper surfaces US of the pair of under-hip side portions 12S with respect to the entire area A12S of the pair of under-hip side portions 12S.

In each of the aforementioned examples, the ratio R12CB of the total area A12*h*CB of the under-hip holes 12*h* in the back surface BS of the under-hip center portion 12C with respect to the entire area A12C of the under-hip center portion 12C in the horizontal projection plane is preferably 1 to 23% and is more preferably 3 to 21%.

Also, the ratio R12SB of the total area A12*h*SB of the under-hip holes 12*h* in the back surfaces BS of the pair of under-hip side portions 12S with respect to the entire area A12S of the pair of under-hip side portions 12S in the horizontal projection plane is preferably 0.5 to 15% and is more preferably 2 to 13%.

In this manner, it is possible to effectively reduce wobbling.

In terms of similar points, the ratio R12CB of the total area A12*h*CB of the under-hip holes 12*h* in the back surface BS of the under-hip center portion 12C with respect to the entire area A12C of the under-hip center portion 12C in the horizontal projection plane is preferably 1.1 to 3.0 times and is more preferably 1.5 to 2.5 times the ratio R12SB of the total area A12*h*SB of the under-hip holes 12*h* in the back surfaces BS of the pair of under-hip side portions 12S with respect to the entire area A12S of the pair of under-hip side portions 12S.

In each of the aforementioned examples, each of the areas of the under-femoral-region holes 11*h* in the upper surface US of the femoral region-placed portion 11 in the horizontal projection plane is preferably larger than each of the areas of the under-hip holes 12*h* in the upper surface US of the under-hip portion 12 as illustrated in FIG. 2.

In this manner, the seated person can easily move the femoral region of the person himself/herself, and it is thus possible to improve operability. Also, since the hip is securely supported, it is possible to improve ride comfort.

Note that in the example of FIG. 2, the areas of the under-femoral-region holes 11*h* in the upper surface US are the same with each other, the areas of the under-hip holes 12*h* in the upper surface US of the under-hip center portion 12C are the same with each other, and the areas of the under-hip holes 12*h* in the upper surfaces US of the pair of under-hip side portions 12B are the same with each other, in the horizontal projection plane. Also, each of the areas of the under-hip holes 12*h* in the upper surface US of the under-hip center portion 12C is larger than each of the areas of the under-hip holes 12*h* in the upper surfaces US of the pair of under-hip side portions 12B in the horizontal projection plane.

However, the areas of the under-femoral-region holes 11*h* in the upper surface US may be different from each other, the areas of the under-hip holes 12*h* in the upper surface US of the under-hip center portion 12C may be different from each other, and the areas of the under-hip holes 12*h* in the upper surfaces US of the pair of under-hip side portions 12B may be different from each other, in the horizontal projection plane.

Note that the size relationship of the areas of the under-femoral-region holes 11*h* in the upper surface US of the femoral region-placed portion 11, the areas of the under-hip holes 12*h* in the upper surface US of the under-hip center portion 12C, and the areas of the under-hip holes 12*h* in the upper surfaces US of the pair of under-hip side portions 12B may be an arbitrary relationship in the horizontal projection plane. For example, the areas of the under-hip holes 12*h* in the upper surface US of the under-hip portion 12 may be the same from each other in the horizontal projection plane. Additionally/alternatively, the areas of the holes 10*h* in the upper surface US of the seating portion 10 may be the same from each other in the horizontal projection plane.

In each of the aforementioned examples, a diameter d12 of each under-femoral-region hole 11*h* in the upper surface US of the femoral region-placed portion 11 is preferably larger than a diameter d22 of each under-hip hole 12*h* in the upper surface US of the under-hip portion 12 (d12>d22) in the horizontal projection plane as illustrated in FIG. 2.

In this manner, the seated person can easily move the femoral region of the person himself/herself, and it is thus possible to improve operability. Also, since the hip is securely supported, it is possible to improve ride comfort.

Here, it is assumed that the "diameter (d12, d22)" of the holes 10*h* (the under-femoral-region holes 11*h* and the under-hip holes 12*h*) indicates the diameter of circumscribed circles of the holes 10*h* in the horizontal projection plane in a case in which the holes 10*h* have a non-circular shape in the horizontal projection plane.

Note that in the example of FIG. 2, the diameters d12 of the under-femoral-region holes 11*h* in the upper surface US are the same with each other, the diameters d22 of the under-hip holes 12*h* in the upper surface US of the under-hip center portion 12C are the same with each other, and the diameters d22 of the under-hip holes 12*h* in the upper surfaces US of the pair of under-hip side portions 12B are the same with each other in the horizontal projection plane. Also, the diameter d22 of each under-hip hole 12*h* in the upper surface US of the under-hip center portion 12C is larger than the diameter d22 of each under-hip hole 12*h* in the upper surfaces US of the pair of under-hip side portions 12B in the horizontal projection plane.

However, the diameters d12 of the under-femoral-region holes 11*h* in the upper surface US may be different from each other, the diameters d22 of the under-hip holes 12*h* in the upper surface US of the under-hip center portion 12C may be different from each other, and the diameters d22 of the under-hip holes 12*h* in the upper surfaces US of the pair of under-hip side portions 12B may be different from each other, in the horizontal projection plane.

Note that the size relationship of the diameters d12 of the under-femoral-region holes 11*h* in the upper surface US of the femoral region-placed portion 11, the diameters d22 of the under-hip holes 12*h* in the upper surface US of the under-hip center portion 12C, and the diameters d22 of the under-hip holes 12*h* in the upper surfaces US of the pair of under-hip side portions 12B may be an arbitrary relationship in the horizontal projection plane. For example, the diameters d22 of the under-hip holes 12*h* in the upper surface US of the under-hip portion 12 may be the same with each other in the horizontal projection plane. Additionally/alternatively, the diameters d12 and d22 of the holes 10h in the upper surface US of the seating portion 10 may be the same with each other in the horizontal projection plane.

In each of the aforementioned examples, the diameter d12 of each under-femoral-region hole 11h in the upper surface US of the femoral region-placed portion 11 is preferably 10 to 40 mm and is more preferably 13 to 37 mm. Also, the area of each under-femoral-region hole 11h in the upper surface US of the femoral region-placed portion 11 is preferably 78 to 1256 mm$^2$ and is more preferably 132 to 1075 mm$^2$.

Also, in each of the aforementioned examples, the diameter d22 of each under-hip hole 12h in the upper surface US of the under-hip portion 12 is preferably 5 to 35 mm and is more preferably 8 to 32 mm. Also, the area of each under-hip hole 12h in the upper surface US of the under-hip portion 12 is preferably 19 to 962 mm$^2$ and is more preferably 50 to 804 mm$^2$.

In this manner, it is possible to improve operability and to improve seating comfort.

In each of the aforementioned examples, a diameter d13 of each under-femoral-region hole 11h in the back surface BS of the femoral region-placed portion 11 is preferably 5 to 40 mm and is more preferably 8 to 37 mm. Also, the area of each under-femoral-region hole 11h in the back surface BS of the femoral region-placed portion 11 is preferably 19 to 1256 mm$^2$ and is more preferably 50 to 1075 mm$^2$.

Also, in each of the aforementioned examples, a diameter d23 of each under-hip hole 12h in the back surface BS of the under-hip portion 12 is preferably 2 to 39 mm and is more preferably 5 to 35 mm. Also, the area of each under-hip hole 12h in the back surface BS of the under-hip portion 12 is preferably 3 to 1193 mm$^2$ and is more preferably 19 to 962 mm$^2$.

In this manner, it is possible to improve operability and to improve seating comfort.

In the example of FIG. 2, a distance l11 between the under-femoral-region holes 11h is smaller than a distance l12 between the under-hip holes 12h (l11<l12). The "distance l11" between the under-femoral-region holes 11h is a distance between outer edges of a pair of mutually adjacent under-femoral-region holes 11h at a position at which the outer edges of the pair of under-femoral-region holes 11h are the closest to each other in the horizontal projection plane. The "distance l12" between the under-hip holes 12h is a distance between outer edges of a pair of mutually adjacent under-hip holes 12h at a position at which the outer edges of the pair of under-hip holes 12h are the closest to each other in the horizontal projection plane.

In this case, it is possible to further improve operability.

However, the distance l11 between the under-femoral-region holes 11h may be the same as the distance l12 between the under-hip holes 12h (l11=l12) or may be larger than the distance l12 (l11>l12).

In each of the aforementioned examples, the distance l11 between the under-femoral-region holes 11h is preferably 2 to 50 mm and is more preferably 5 to 40 mm in terms of an improvement in operability and seating comfort. Also, the distance l12 between the under-hip holes 12h is preferably 5 to 70 mm and is more preferably 10 to 60 mm.

In each of the aforementioned examples, a ratio RW (RW=W2×100/W1 [%]) of a total weight W2 of the actual seat pad 1 (cushion pad 1a) having the holes 10h with respect to a total weight W1 of the seat pad 1 (cushion pad 1a) in a case in which the seat pad 1 (cushion pad 1a) has no holes 10h (the holes 10h are filled with the same resin foam as that of the portion other than the holes 10h) is preferably 97% or less and is more preferably 92% or less in terms of an improvement in operability, weight reduction, an improvement in breathability, and reduction of heat storage. On the other hand, the ratio RW is preferably 70% or more and is more preferably 75% or more in terms of an improvement in seating comfort.

In each of the aforementioned examples, in a case in which the holes 10h provided in the seating portion 10 are bottomed holes, the depth of the holes 10h (the length in the up-down direction) is preferably 30% or more and less than 100% of the thickness of the seating portion 10 (the length in the up-down direction).

Examples and Comparative Examples

Evaluation of Comparative Examples 1 and 2 and Example 1 of the seat pad according to the disclosure will be described.

Table 1 illustrates evaluation of samples of cushion pads for vehicle seat pads according to Comparative Examples 1 and 2 and Example 1 of the disclosure.

All the samples in Comparative Examples 1 and 2 and Example 1 have the same outer shape dimension, are of the same material (composition), have different hole configurations, and thus have different weights of cushion pads. The sample in Comparative Example 1 does not have holes while the samples in Comparative Example 2 and Example 1 have bottomless holes. In Comparative Example 2, a plurality of bottomless under-femoral-region holes 11h and a plurality of bottomless under-hip holes 12h are uniformly disposed at constant pitch intervals, R11U=R12U, and R12CU=R12SU. In Example 1, R11U>R12, and R11U>R12CU>R12SU are satisfied.

In regard to the sample in each example, evaluation on each of a wobbling angle, a weight ratio, breathability, heat storage resistance, (25% hardness of femoral region-placed portion 11)×100/(25% hardness of under-hip portion 12), operability, and seating comfort, which will be described below, are as illustrated in Table 1.

(Wobbling Angle)

"Wobbling angle (°)" in Table 1 is a swinging angle when the sample in each example is placed on a test stand, 45 kg of hip-shaped jig was placed on the sample, and the swinging angle of the hip-shaped jig with respect to the test stand at the time of applying roll vibration to the sample along with the test stand is measured. The roll vibration is applied by applying vibration in the left-right direction around a rotation axis extending in the front-back direction of the seat pad. The swinging angle is measured through motion capture. A smaller wobbling angle (°) indicates higher performance (wobbling resistance) of reducing wobbling of the seated person when vibration in the left-right direction is input to the seat pad.

(Mass Ratio)

"Mass ratio (%)" in Table 1 represents the mass of the sample in each Example when the weight of the sample in Comparative Example 1 is assumed to be 100%. A lower mass ratio (%) indicates that further weight reduction of the seat pad is able to be achieved.

(Breathability)

"Breathability" in Table 1 is based on measurement of the air flow amount of each sample in each example in accordance with the JIS K6400-7 B method.

In Table 1, "Good" represents a "satisfactory" evaluation result, and "Fair" represents an "ordinary" evaluation result.

(Heat Storage Resistance)

"Heat storage resistance" in Table 1 represents how heat is unlikely to be stored in the seat pad. The heat storage resistance is evaluated by measuring temperature changes in an atmosphere and the sample when the atmosphere in the surroundings of the sample in each example is changed from a high temperature to a low temperature. Specifically, the sample is disposed in a thermostatic bath with an atmospheric temperature of 60° C. first and is left until the temperature of the sample became constant at 60° C. Then, after the temperature of the sample becomes constant at 60°, the setting of the atmospheric temperature in the thermostatic bath is changed from 60° C. to 25° C., and a temperature change of the atmospheric temperature and a temperature change in the sample at that time are measured. For the temperature of the sample, measurements are taken at the center of the under-hip portion (the center in the horizontal projection plane and also the center of the center portion in the thickness direction) using a thermocouple. Then, a graph of the temperature change in the sample (the axis of ordinates represents time, and the axis of ordinates represents a temperature) and a graph of the temperature change in the atmosphere (the axis of ordinates represents time, and the axis of ordinates represents a temperature) are compared, and how likely is it for the sample to follow the temperature change in the atmosphere is evaluated as the heat storage resistance. As the graph of the temperature change in the sample is closer to the graph of the temperature change in the atmosphere, the sample is evaluated to be more likely to follow the temperature change in the atmosphere, and thus, the heat storage resistance of the sample is evaluated to be more satisfactory (heat is less likely to be stored).

In Table 1, "Good" represents a "satisfactory" evaluation result, and "Fair" represents an "ordinary" evaluation result.

((25% hardness of femoral region-placed portion 11)×100/(25% hardness of under-hip portion 12))

"(25% hardness of femoral region-placed portion 11)×100/(25% hardness of under-hip portion 12) (%)" in Table 1 is a ratio between 25% hardness of the femoral region-placed portion 11 and 25% hardness of the under-hip portion 12 obtained by measuring each of the values of the sample in each example. The 25% hardness (N) is measured in accordance with the JIS K6400-1 D method. When (25% hardness of femoral region-placed portion 11)×100/(25% hardness of under-hip portion 12) is lower, this means that the femoral region-placed portion 11 is softer than the under-hip portion 12 and better operability is achieved.

(Operability)

"Operability" in Table 1 indicates sensory assessment of operability that a person who conducts the evaluation feels when seated in the sample in each example.

In Table 1, "Good" represents a "satisfactory" evaluation result, and "Fair" represents an "ordinary" evaluation result.

(Seating Comfort)

"Seating comfort" in Table 1 indicates sensor assessment of seating comfort that the person who conducts evaluation feels when seated in the sample in each example.

In Table 1, "Good" represents a "satisfactory" evaluation result, and "Fair" represents an "ordinary" evaluation result.

TABLE 1

| | Comparative Example 1 | Comparative Example 2 | Example 1 |
|---|---|---|---|
| Wobbling angle [°] | 1.25 | 1.62 | 1.32 |
| Mass ratio [%] | 100 | 95 | 95 |
| Breathability | Fair | Good | Good |
| Heat storage resistance | Fair | Good | Good |
| (25% hardness of femoral region-placed portion 11) × 100/(25% hardness of under-hip portion 12) [%] | 81.8 | 83.2 | 76.6 |
| Operability | Fair | Fair | Good |
| Seating comfort | Fair | Fair | Good |

As illustrated in Table 1, better operability and seating comfort are achieved in Example 1 than in Comparative Examples 1 and 2. Also, more excellent weight ratio and thus light weight, breathability, and heat storage resistance are achieved in Example 1 than in Comparative Example 1 although wobbling angles and thus wobbling resistance (performance of reducing wobbling) are substantially the same. Moreover, more excellent wobbling angle and thus wobbling resistance are achieved in Example 1 than in Comparative Example 2.

INDUSTRIAL APPLICABILITY

The vehicle seat pad according to the disclosure can be used for an arbitrary type of vehicle. Also, the vehicle seat pad according to the disclosure is preferably used for a driver's seat, in particular.

REFERENCE SIGNS LIST

1 Vehicle seat pad (seat pad)
1a Cushion pad
10 Seating portion (main pad portion)
10h Hole
11 Femoral region-placed portion
11h Under-femoral-region hole
12 Under-hip portion
12h Under-hip hole
12C Under-hip center portion
12S Under-hip side portion
20 Side pad portion
30 Back pad facing portion
40a, 40b, 40c Groove
1b Back pad
100 Vehicle seat
101 Cover
102 Headrest
B1 First boundary position
B12 Second boundary position
T Frontmost end position
US Upper surface
C Left-right direction center line

The invention claimed is:
1. A vehicle seat pad comprising:
a seating portion that is formed of a resin foam for supporting a seated person,
wherein when a portion of the seating portion on a front side beyond a first boundary position that is separated from a frontmost end position of the seating portion by a length of 45% of an entire length of the seating portion in a front-back direction is defined as a femoral region-placed portion while a portion on a back side beyond the first boundary position is defined as an under-hip portion, and a portion of the under-hip portion on an inner side in a left-right direction beyond a pair of second boundary positions that are separated on outer sides in the left-right direction from a left-right direction center line of the seating portion by a length of 25% of an entire length of the under-hip portion in the left-right direction is defined as an under-hip center portion while portions on both the outer sides in the left-right direction beyond the pair of second boundary positions are defined as a pair of under-hip side portions, the seating portion has a plurality of bottomless or bottomed holes opened in an upper surface of the seating portion, the plurality of holes include one or a plurality of under-femoral-region holes provided in the femoral region-placed portion and one or a plurality of under-hip holes provided in the under-hip portion, in a horizontal projection plane, a ratio R11U of a total area of the under-femoral-region holes in the upper surface in the femoral region-placed portion with respect to an entire area of the femoral region-placed portion, a ratio R12CU of a total area of the under-hip holes in the upper surface in the under-hip center portion with respect to an entire area of the under-hip center portion, and a ratio R12SU of a total area of the under-hip holes in the upper surface in the pair of under-hip side portions with respect to an entire area of the pair of under-hip side portions satisfy R11U>R12CU>R12SU, and each of the areas of the under-femoral-region holes in the upper surface in the femoral region-placed portion is larger than each of the areas of the under-hip holes in the upper surface in the under-hip portion.

2. The vehicle seat pad according to claim 1, wherein in the horizontal projection plane,
the ratio R11U is 5 to 25%,
the ratio R12CU is 2 to 23%, and
the ratio R12SU is 1 to 15%.

* * * * *